Nov. 16, 1954    R. C. ZEIDLER    2,694,478
FLYWHEEL AND CLUTCH ASSEMBLY
Filed Dec. 15, 1950    3 Sheets-Sheet 1

Inventor:
Reinhold C. Zeidler

Nov. 16, 1954            R. C. ZEIDLER            2,694,478
FLYWHEEL AND CLUTCH ASSEMBLY
Filed Dec. 15, 1950                          3 Sheets-Sheet 2
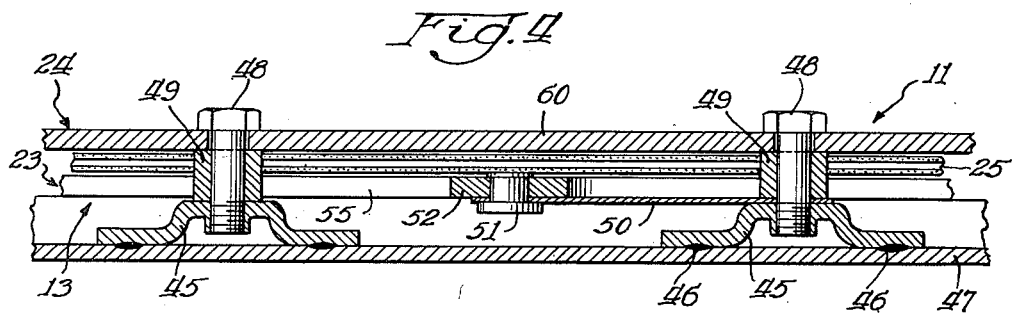
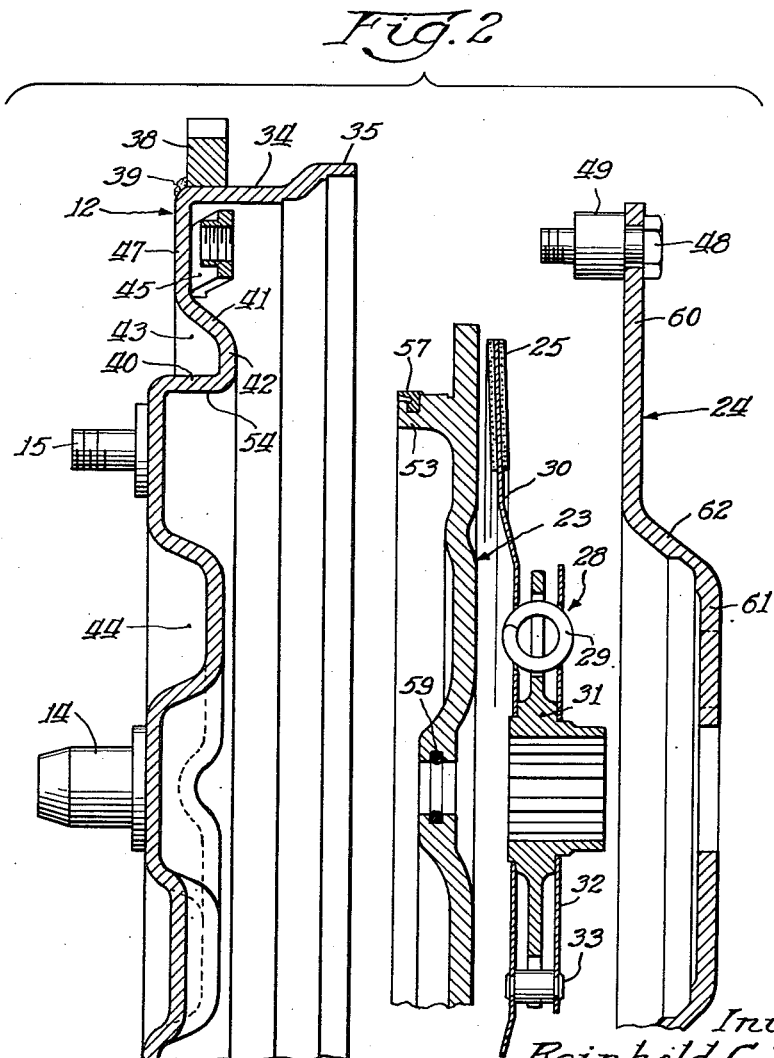
Inventor:
Reinhold C. Zeidler Nov. 16, 1954  R. C. ZEIDLER  2,694,478
FLYWHEEL AND CLUTCH ASSEMBLY
Filed Dec. 15, 1950  3 Sheets-Sheet 3

Inventor:
Reinhold C. Zeidler
By

United States Patent Office 2,694,478
Patented Nov. 16, 1954

2,694,478

FLYWHEEL AND CLUTCH ASSEMBLY

Reinhold C. Zeidler, Detroit, Mich., assignor to Borg-Warner Corporation, Chicago, Ill., a corporation of Illinois Application December 15, 1950, Serial No. 200,916

7 Claims. (Cl. 192—68)

This invention relates to flywheel and friction clutch assemblies of a type which are adapted primarily, but not exclusively, for use in automotive vehicles. One of the objects of the invention is to provide a light weight flywheel and clutch assembly of strong construction adapted for efficient operation in automotive vehicles and other installations.

Another object is to provide a flywheel and clutch assembly of novel construction and having a number of its parts made of stamped sheet metal to simplify and reduce the weight of the assembly without sacrificing strength or impairing the operation of the clutch assembly.

Another object of the invention is to provide a friction clutch of novel form and of the type operable by fluid under pressure.

A further object of the invention is to provide a flywheel and clutch assembly wherein the flywheel may comprise a stamped sheet metal plate drivingly connected to the pressure plate of the clutch and defining a fluid pressure chamber therewith.

Another object of the invention is to provide a flywheel and clutch assembly wherein the flywheel is drivingly connected to the pressure plate of the clutch, the flywheel mounting and supporting the pressure plate for movement into engagement with the driven clutch plate of the clutch.

A further object of the invention is to provide a clutch wherein the driving means of the clutch includes a stamped sheet metal drive plate, and a pressure plate supported by said driving plate, the drive plate defining a char*ber for pressure fluid actuating the pressure plate into engagement with the driven clutch plate of the clutch.

A further object of the invention is to provide a novel clutch wherein the driving plate and the pressure plate drivingly connected thereto and guidingly supported thereby have cooperating stop means for limiting relative movement of the pressure plate and the driving plate.

Another object of the invention is to provide a clutch having a driving plate, a back plate, and a pressure plate connected together for rotation, certain of the plates being formed preferably of sheet metal to provide a clutch of axial compact dimension for this purpose, the back plate being formed to provide a chamber within which is received a vibration dampener assembly conventionally used with driven clutch plates, and the means connecting the plates extending into the plane of the driving plate.

Additional objects, aims, and advantages of the improvements contemplated therein will be apparent to persons skilled in the art, after the construction and arrangement of the flywheel and clutch assembly is understood from the within description.

It is preferred to accomplish the numerous objects hereof and to practice the invention, in substantially the manner hereinafter fully described and as, more particularly, pointed out in the appended claims. Reference is now made to the accompanying drawings forming a part of this specification:

In the drawings:

Fig. 2 is a view similar to Fig. 1 showing the flywheel and clutch plate assembly, with its component parts separated axially to more clearly illustrate the invention;

Fig. 4 is a sectional view taken on line 4—4 of Fig. 3 and looking in the direction of the arrows.

Figure 1:
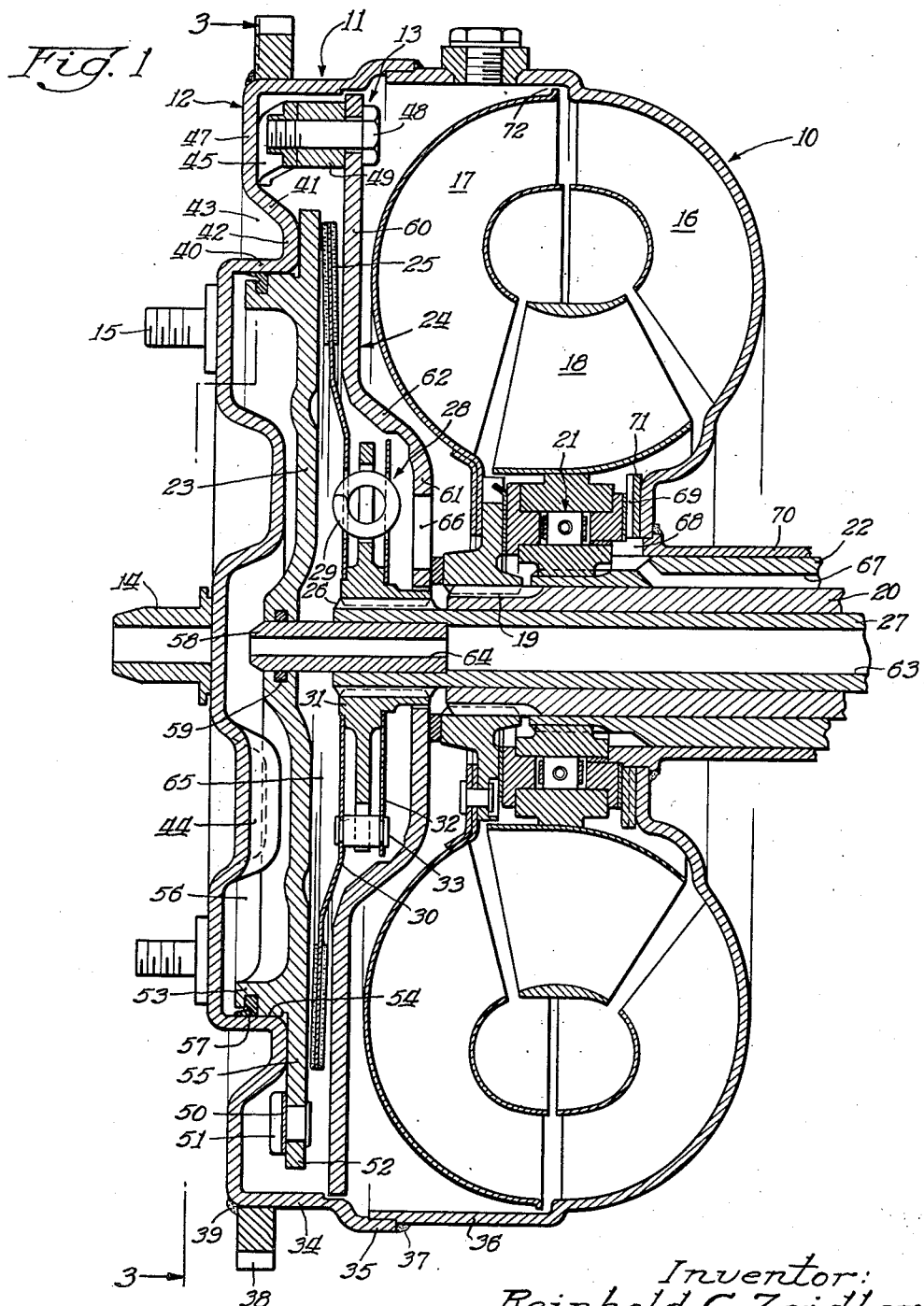
Fig. 1 is a longitudinal, axial section of a drive mechanism embodying the present improvements of my flywheel and clutch assembly.

Referring to the drawings and, more particularly, Fig. 1 thereof, my improved flywheel and clutch assembly is shown in combination with a hydraulic torque converter to form a drive mechanism which may be positioned between and connected to a source of motive power, such as an automobile engine, and a plurality of driven shafts which may be connected to transmission gearing drivingly connected to the road wheels of an automobile. The drive mechanism is designed to provide two paths of power flow from the engine to an output shaft connected to the automobile road wheels, one of these paths containing the hydraulic torque converter 10 and the other path containing the improved flywheel and clutch assembly identified generally at 11, the flywheel 12 being drivingly connected to the hydraulic torque converter 10 and being capable of also being drivingly connected to the output shaft by means of the clutch assembly identified generally at 13.

More particularly, the flywheel 12 is provided with a hub 14 which may be received within a recess in the engine crankshaft (not shown) which provides a support therefor, a plurality of bolts 15 being connectible to the engine crankshaft to secure the latter and the flywheel for conjoint rotation. The flywheel 12 is connected at its outer periphery to the impeller 16 of the hydraulic torque converter for rotating the same. The hydraulic torque converter comprises the bladed impeller 16, a turbine 17 and a stator 18 having blades defining a toroidal path for the circulation of fluid through the torque converter from the impeller to the turbine, to the stator and thence to the impeller for recirculation. The turbine 17 is splined as at 19 to a sleeve shaft 20, and the stator 18 is provided with an overrunning clutch generally indicated at 21 for restraining rotation of the stator during the torque conversion stages of the hydraulic torque converter in a manner well known in the art, the overrunning clutch being mounted between the stator 18 and a stationary sleeve 22 for this purpose. It will be seen from the foregoing description that, upon rotation of the flywheel 12 by the automobile engine, the impeller 16 of the torque converter 10 will be rotated causing rotation of the turbine 17 to effect a drive of the driven shaft 20.

The flywheel 12 is drivingly connected to a pressure plate 23 and a back plate 24 of the clutch 13 in a manner hereinafter described to effect conjoint rotation of the flywheel 12, the pressure plate 23 and the back plate 24, the latter plates receiving therebetween a driven clutch plate 25 suitably splined as at 26 to a driven shaft 27, upon engagement of the driven clutch plate 25 with the pressure plate 23 and the back plate 24. The driven clutch plate 25 is provided with a torsion vibration dampener assembly indicated generally at 28 of well known form, the torsion vibration dampener assembly comprising a spring 29 for drivingly connecting the friction facing-carrying disc 30, hub 31 and a plate 32, the disc 30 and plate 32 being connected by rivets 33 for rotation relative to the hub 31. The torsion vibration dampener assembly is more fully described in Wemp Patent 2,042,570, issued June 2, 1936.

Describing the flywheel and clutch assembly in greater detail, the assembly comprises, as its component parts, the flywheel plate 12, a pressure plate 23 and a back plate 24, the plates 12 and 24 being formed of stamped sheet metal, such as steel or the like, and the driven clutch plate generally indicated at 25. The flywheel plate 12, as shown in Figs. 1 and 2, has a cylindrical outer peripheral wall 34 terminating in an outwardly turned axially extending peripheral flange 35 overlapping and secured to the hollow shell 36 of the impeller as by welding at 37. An annular ring gear 38 surrounds the wall 34 of the plate 12 and is welded as at 39 to the wall 34.

In the stamping operation, the plate 12 is formed with a cylindrical axially extending wall 40, a wall 41 disposed at an angle to the axis of the plate, and a connecting radial wall 42 to form a channel-shaped section providing an annular channel 43 for a purpose described hereinafter A plurality of recessed regions are formed in the plate, these regions being identified at 44 and being disposed radially inwardly of the channel 43, the indented regions being shown as 6 in number and serving the purpose of imparting rigidity and strength to the plate.

The flywheel plate is drivingly connected to the back plate 24 by a plurality of brackets 45 substantially U-shaped in cross section as illustrated in Fig. 4, the brackets being welded as at 46 to a flat radially extending wall 47 of the plate, with the bottom of each bracket being in spaced relation to said wall and having the openings therein through which extend and is threaded a bolt 48. Each bolt 48 extends through openings formed in the outer periphery of the back plate 24 through a spacer ring or washer 49, maintaining the back plate and the flywheel plate in fixed axially spaced relation to each other.

Figure 3:
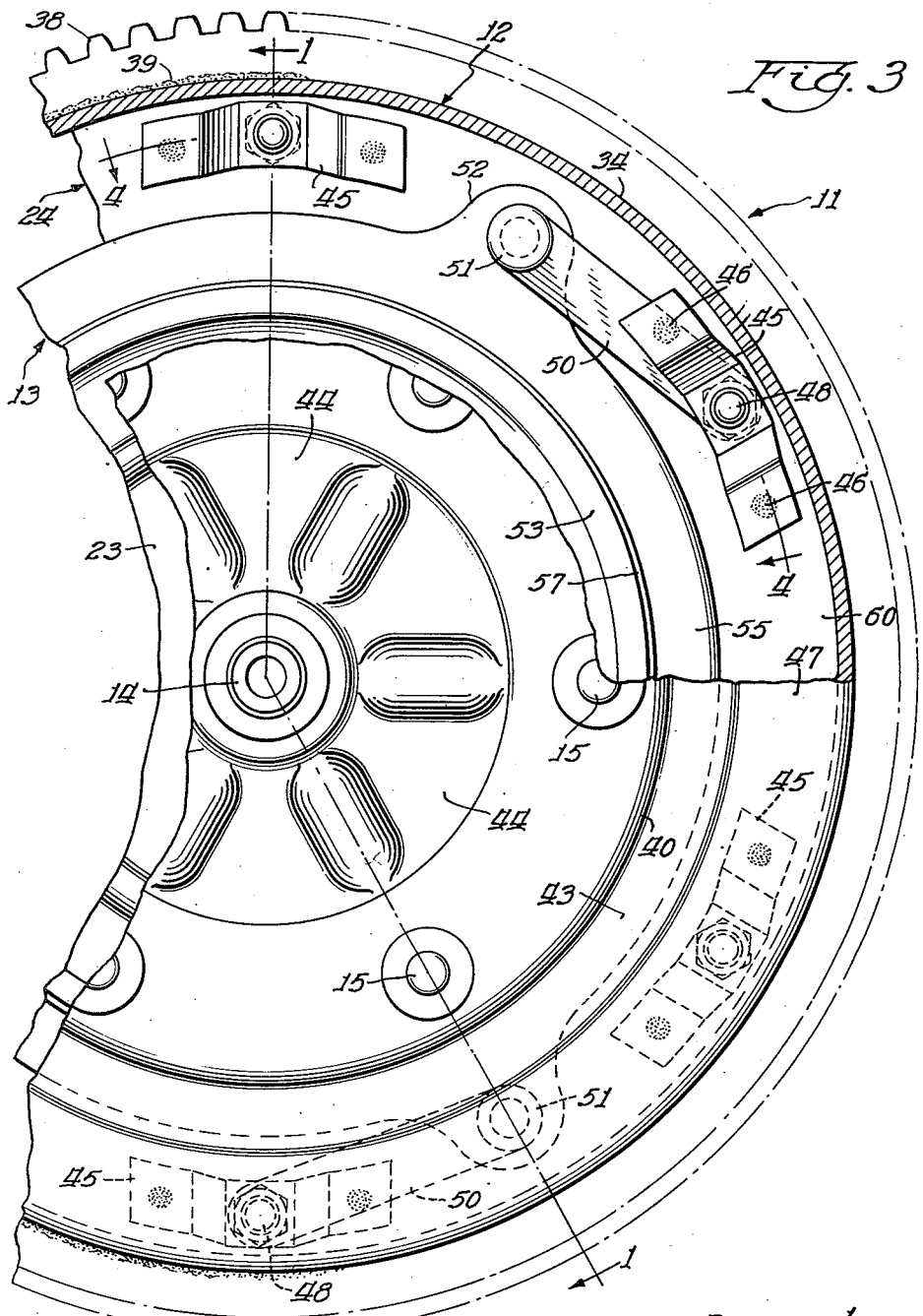
Fig. 3 is a plan view of the flywheel and clutch plate assembly looking in the direction of the arrows 3—3 in Fig. 1, certain portions of the parts of the assembly being removed to more clearly illustrate the structural features of the assembly.

The back plate 24 is drivingly connected to the pressure plate 23. For this purpose, drive is transmitted from the back plate 24 to the pressure plate 23 through the medium of thin flexible metal straps 50 (Fig. 4), each secured at one end to the back plate by the bolt 48 which extends through an opening in one end of the strap received between the spacer ring or washer 49 and a bracket 45. The other end of the metal strap is secured by means of rivets 51 to lugs 52 extending radially outwardly of the periphery of the annular pressure plate as clearly shown in Figs. 3 and 4. It can thus be seen that the metal straps are secured directly to the pressure plate and the back plate, respectively, and yet are positioned between the two plates, spaced axially from both. This permits the metal straps to form flexible links which flex freely so as to accommodate relative axial movement between the pressure plate and the back plate, without interference with either, while also acting to center the pressure plate with respect to the flywheel plate and the back plate.

The pressure plate is adapted to be urged by fluid pressure toward the driven plate 25 and the back plate 24 to grippingly engage the driven clutch plate between the pressure plate 23 and the back plate 24 to effect a driving connection between the flywheel plate and the driven shaft 27. As shown in Figs. 1 and 2, the pressure plate 23 is in the form of an annular piston-like plate having an axially extending cylindrical flange 53 extending within the annular wall 40 of the flywheel plate, the cylindrical surface 54 of the wall 40 of the plate cooperating with the flange 53 of the pressure plate 23 to guidingly support the pressure plate for movement toward and from the driven plate 25. The pressure plate 23 has an outer peripheral region extending radially outwardly from the flange 48, this region being identified at 55 and having abutting relation with the wall 42, connecting the walls 40 and 41 and defining therewith the channel 45 in the plate, the wall 42 and region 55 cooperating to form stop means for restricting movement of the pressure plate 23 away from the driven plate 25.

Referring to Fig. 1, the flywheel plate and the pressure plate define a fluid pressure chamber 56. More particularly, this fluid pressure chamber is defined at its radially outer limits by the cylindrical wall 40 of the flywheel plate and the annular flange 53 of the pressure plate, the flange of the pressure plate having an annular groove therein for receiving a rubber seal ring 57, of the lip seal type, preventing the passage of fluid from the chamber 56 between the opposed surfaces of the wall 40 of the flywheel plate and the flange 53 of the pressure plate. The pressure plate 23 is provided with an axial opening for reception of a stub shaft 58 received within the hollow sleeve shaft 27 and being firmly fixed thereto, such as by a press fit. The pressure plate 23 is rotatably mounted upon the stub shaft 58 and is also axially movable thereon. Escape of fluid under pressure from the chamber 56 along the shaft 58 is prevented by a rubber O-ring 59 received within an annular recess in the inner periphery of the annular pressure plate 23 and defining the axially extending opening therein, the ring 59 having sealing engagement with the stub shaft 58.

It will be noted from an inspection of Figs. 1 and 2 that the back plate 24, in the form of an annular ring, has a wall 60 thereof engageable with the driven clutch plate 25 and also having a wall 61 axially spaced from the wall 60 and defining with an angularly related connecting wall 62 a domed or bell-shaped housing within which is received the vibration dampener assembly of the driven plate 25. This feature has considerable advantage in providing a clutch and flywheel assembly having minimum axial dimensions and providing maximum compactness, particularly in an axial direction.

It will be apparent that my flywheel and clutch assembly achieves an improved compactness making the clutch particularly suitable in connection with automatic and semi-automatic transmissions which require that the space available for the engine clutch be reduced to a minimum. In view of the fact that the component parts of the flywheel and clutch assembly are formed of sheet metal stampings, maximum economy of construction is obtained. The stampings may be readily formed to achieve a compact design, for example, the wall 40 of the flywheel plate for supporting and guiding the pressure plate 23 lies in a plane intersecting the plane in which the back plate-connecting wall 47 of the flywheel plate lies. It may also be noted that by the use of flexible driving links, such as the flexible straps 50, the driving connections are confined within the narrow space shown between the flywheel plate and the back plate thereby contributing to the axial compactness of the clutch.

In the operation of the clutch, pressure fluid may be admitted to the aligned axial openings 63 and 64 in the shafts 27 and 58, respectively, and then into the pressure chamber 56 formed by the pressure plate and the flywheel plate to effect operation of the piston-like pressure plate toward and into engagement with the driven clutch plate to clamp the driven clutch plate between the pressure plate and the back plate to drivingly connect the flywheel plate and the shaft 27. Upon release of fluid pressure in the pressure chamber 56, pressure fluid in the torque converter 10 will move the pressure plate toward the flywheel plate to effect disengagement of the clutch. More particularly and as shown in Fig. 1, the pressure fluid in the torque converter has access to the compartment 65 between the back plate and the pressure plate by the provision of an opening 66 in the back plate 24. It is contemplated that fluid under pressure be continuously transmitted to the torque converter 10 by means of a passage 67 in the stationary shaft 22 and thence through radially aligned openings 68 and 69 in the hub 70 and washer 71, respectively, and into the torque converter. The fluid under pressure may also flow between the space between the turbine 17 and the back plate 24 through the gap 72 between the radially outer edge of the turbine 17 and the outer shell of the impeller 16 as shown in Fig. 1. The fluid under pressure in the torque converter is substantially less than that of the fluid under pressure admitted to the chamber 56 of the flywheel and clutch assembly, so that the pressure plate 23 may be moved toward and into engagement with the driven clutch plate 25. However, the fluid under pressure in the torque converter is effective to move the pressure plate toward the flywheel plate upon the release of fluid pressure in the chamber 56. It is also contemplated that the steel straps may, in addition to their main function of transmitting torque, also be adapted to serve as retractor springs. To this end, they may be made of spring metal and formed in such manner, that, when assembled under pre-tension, they will act to yieldingly urge the pressure plate toward released position.

Although a preferred embodiment of the invention has been described in detail, it is to be understood that modifications may be made without departing from the spirit and scope of the invention as defined in the following claims.

I claim:

1. In a clutch assembly, a sheet metal driving plate having a channel-shaped portion having radially spaced inner and outer walls intersecting the plane of said plate, said inner wall providing a cylindrical surface, and a driven member connected to said driving plate for rotation therewith and having an annular portion thereof radially inward of said inner wall and engaging and guidingly supported on said cylindrical surface thereof.

2. In a clutch assembly, a flywheel of sheet metal stamped to provide a portion of channel-shaped section having a cylindrical surface, a plurality of recessed regions radially inwardly of said portion, and a wall radially outwardly of said portion; a back plate axially spaced from said flywheel; means connecting said back plate to said flywheel and maintaining the same in axially spaced relation including a plurality of U-shaped brackets circumferentially spaced about and secured to said flywheel wall and connected to said back plate; a pressure plate between said flywheel and back plate and disposed radially inwardly of said connecting means, said pressure plate having an annular portion engaging and guidingly supported by said flywheel surface; and means connecting said pressure plate to said back plate including a plurality of circumferentially spaced flexible metallic straps disposed between and connected to said pressure and back plates.

3. In a clutch assembly as defined in claim 2 wherein the said flywheel wall lies in a plane intersecting the cylindrical surface and recessed regions of said flywheel.

4. In a clutch assembly, a flywheel plate having a portion of channel-section spaced from the axis thereof and having a cylindrical surface, and an attaching portion disposed radially outward of the said channel-section portion and axially spaced from the bottom wall of said channel-section; a back plate axially spaced from said flywheel plate; a pressure plate between said flywheel and back plates and having an annular wall engaging said cylindrical surface of said flywheel plate; means connecting said back plate to the attaching portion of said flywheel plate and maintaining said back and flywheel plates in axially spaced relation, said attaching portion being disposed in a radial plane intersecting said channel-section portion of said flywheel plate; and means connecting said pressure plate to said back plate for movement relative thereto.

5. In a clutch assembly, a flywheel plate having an outer peripheral flange extending axially thereof, and a portion of channel cross-section radially inward of said flange providing a cylindrical surface intersecting the plane of said plate, and a radial wall connecting said flange and the radially outer wall of said portion and defining therewith an annular pocket; a back plate in axially spaced relation to said flywheel plate; means extending within said pocket and connecting said back plate and said flywheel plate for conjoint rotation; and a pressure plate between said plates and connected to said back plate for movement axially of said clutch assembly and having an annular wall extending axially thereof and engaging said cylindrical surface.

6. A driving plate for a clutch including a pressure plate, said driving plate being stamped from sheet metal and having a flange projecting in an axial direction from one side of said plate, and a portion of channel-section radially inward of said flange and opening in an opposite axial direction, said portion having an axially extending annular wall intersecting the plane of said plate and adapted to mount said pressure plate for movement axially of said driving plate.

7. A clutch plate for supporting a clutch member comprising a sheet metal stamping having a flange projecting in an axial direction from one side of said plate, and a portion of channel section radially inward of said flange and opening in an opposite axial direction, said portion having an axially-extending annular wall intersecting the plane of said plate and adapted to mount said clutch member for movement axially of said clutch plate.

References Cited in the file of this patent

UNITED STATES PATENTS

| Number | Name | Date |
| --- | --- | --- |
| 677,960 | Klockner et al. | July 5, 1939 |
| 2,442,840 | Carnagua | June 8, 1948 |

FOREIGN PATENTS

| Number | Country | Date |
| --- | --- | --- |
| 636,240 | France | Apr. 4, 1928 |
| 925,020 | France | Mar. 17, 1947 |